United States Patent
Hamlin et al.

(10) Patent No.: US 10,496,801 B2
(45) Date of Patent: *Dec. 3, 2019

(54) SYSTEM AND METHOD FOR PROVIDING AN AUTHENTICATION ENGINE IN A PERSISTENT AUTHENTICATION FRAMEWORK

(71) Applicant: Dell Products LP, Round Rock, TX (US)

(72) Inventors: Daniel Hamlin, Round Rock, TX (US); Charles D. Robison, Jr., Buford, GA (US); Carrie Elaine Gates, Livermore, CA (US)

(73) Assignee: Dell Products, LP, Round Rock, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/994,726

(22) Filed: Jan. 13, 2016

(65) Prior Publication Data

US 2016/0210447 A1 Jul. 21, 2016

Related U.S. Application Data

(60) Provisional application No. 62/105,090, filed on Jan. 19, 2015.

(51) Int. Cl.
| | |
|---|---|
| *G06F 21/31* | (2013.01) |
| *G06F 21/34* | (2013.01) |
| *H04L 29/06* | (2006.01) |
| *G06F 21/32* | (2013.01) |
| *G06F 21/62* | (2013.01) |

(52) U.S. Cl.
CPC .......... *G06F 21/31* (2013.01); *G06F 21/316* (2013.01); *G06F 21/32* (2013.01); *G06F 21/34* (2013.01); *G06F 21/6209* (2013.01); *H04L 63/08* (2013.01); *H04L 63/105* (2013.01); *G06F 2221/2113* (2013.01)

(58) Field of Classification Search
CPC .......... G06F 21/31; G06F 21/32; G06F 21/34; G06F 21/316; G06F 21/6209; H04L 63/102
USPC .......................................................... 726/2
See application file for complete search history.

(56) References Cited

U.S. PATENT DOCUMENTS

| | | | |
|---|---|---|---|
| 8,526,743 B1 * | 9/2013 | Campbell | G06K 9/6202 382/181 |
| 9,727,716 B1 | 8/2017 | Rodriguez Magana et al. | |
| 2007/0143851 A1 * | 6/2007 | Nicodemus | G06F 11/3495 726/25 |

(Continued)

*Primary Examiner* — Ashokkumar B Patel
*Assistant Examiner* — William B Jones
(74) *Attorney, Agent, or Firm* — Larson Newman, LLP

(57) ABSTRACT

An authentication engine for an information handling system includes an event engine that receives authentication information from a plurality of input devices of the information handling system and classifies the authentication information from each input device into a plurality of events, and provides confidence score metadata based upon the authentication information, a confidence module that generates a confidence score based upon the events, and a threshold table that receives the confidence score and determines an authentication state of the information handling system based upon the confidence score.

20 Claims, 10 Drawing Sheets

(56) References Cited

U.S. PATENT DOCUMENTS

| | | | | |
|---|---|---|---|---|
| 2008/0086759 A1* | 4/2008 | Colson | ................... | G06F 21/34 |
| | | | | 726/2 |
| 2014/0189829 A1* | 7/2014 | McLachlan | ............ | H04L 63/08 |
| | | | | 726/6 |
| 2014/0289833 A1* | 9/2014 | Briceno | ................. | H04L 63/08 |
| | | | | 726/7 |
| 2014/0366111 A1* | 12/2014 | Sheller | ................... | H04L 63/08 |
| | | | | 726/7 |
| 2015/0163121 A1* | 6/2015 | Mahaffey | ........... | G06F 11/0766 |
| | | | | 707/687 |
| 2015/0334098 A1 | 11/2015 | Keys et al. | | |
| 2016/0004862 A1 | 1/2016 | Almehmadi et al. | | |

\* cited by examiner

Confidence Score vs. Time

300

SYSTEM AND METHOD FOR PROVIDING AN AUTHENTICATION ENGINE IN A PERSISTENT AUTHENTICATION FRAMEWORK

CROSS REFERENCE TO RELATED APPLICATIONS

This application is a non-provisional of U.S. Provisional Application No. 62/105,090, filed on Jan. 19, 2015, the disclosure of which is hereby expressly incorporated by reference in its entirety.

Related subject matter is contained in co-pending U.S. patent application Ser. No. 14/994,723 entitled "System and Method for Providing Persistent Authentication in an Information Handling System," filed of even date herewith, the disclosure of which is hereby incorporated by reference.

Related subject matter is contained in co-pending U.S. patent application Ser. No. 14/994,735 entitled "System and Method for Providing an Authentication Agent in a Persistent Authentication Framework," filed of even date herewith, the disclosure of which is hereby incorporated by reference.

Related subject matter is contained in co-pending U.S. patent application Ser. No. 14/994,765 entitled "System and Method for Providing Confidence Scores in a Persistent Framework," filed of even date herewith, the disclosure of which is hereby incorporated by reference.

FIELD OF THE DISCLOSURE

This disclosure generally relates to information handling systems, and more particularly relates to a system and method for providing persistent authentication in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
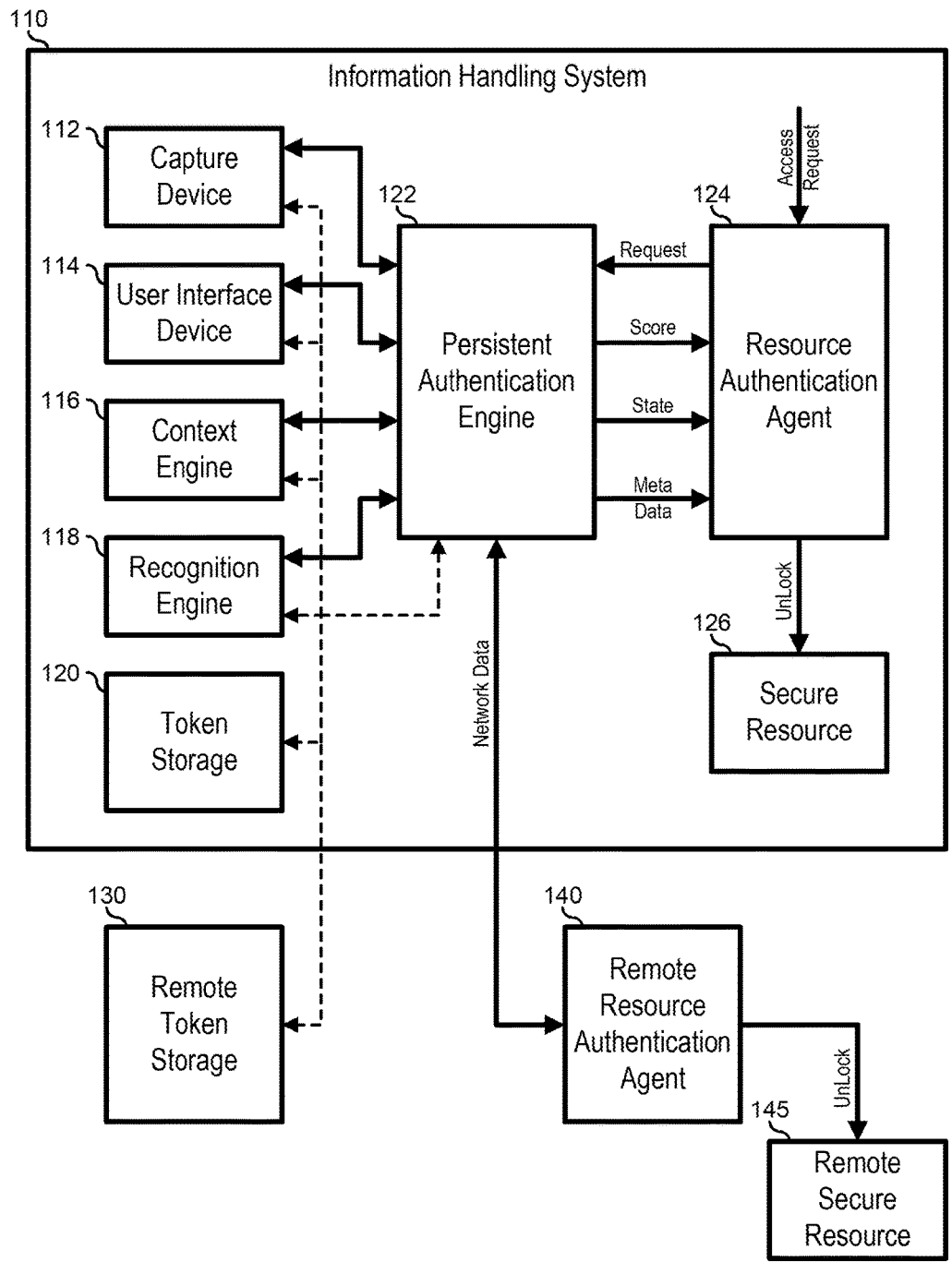
FIG. 1 is a block diagram of an authentication framework according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

The present disclosure describes an authentication framework for an information handling system. The authentication framework includes various authentication devices and context engines which provide inputs to a persistent authentication engine. The persistent authentication engine receives the inputs and provides a confidence score that characterizes the authentication status of a user of the information handling system. The confidence score can increase or decrease based upon various authentication events, such as risk events, assurance events, context events, recognition events, and time-based events.

Risk events are actions or events on the information handling system which tend to decrease the confidence that a current user of the information handling system is the same as the user who initiated a session on the information handling system. For example, a long idle time may be considered as a risk event. Assurance events are actions or events which tend to increase the confidence that the current user is the same as the user who initiated the session, and includes initial logon and authentication activities. Context events are actions or events on the information handling system that indicate that an operating state of the information handling system has changed, such as the opening or closing of a laptop computer. Recognition events are actions or events that lend credibility to the identity of the authenticated user, such as keyboard typing pattern recognition, and the like.

The various event information is provided to a confidence algorithm module within the persistent authentication engine to generate the confidence score. The persistent authentication engine can include one or more confidence thresholds that are provided to define authentication states based upon the confidence score. For example, when the confidence score is below a particular threshold the information handling system may be defined as being in a Restricted state, when the confidence score is above a second threshold the information handling system may be defined as being in a Transactional state, and when the confidence score is between the two thresholds the information handling system may be defined as being in an Authenticated state. The user's ability to access and interact with various resources of the information handling system can be determined by the confidence score or by the authentication state.

The persistent authentication engine provides one or more of the confidence score, the authentication state, and confidence score meta-data associated with the various event information that went into generating the confidence score, to one or more resource authentication agents. Each resource authentication agent uses the information provided by the persistent authentication engine to control the user's ability to access and interact with a secure resource. In a first embodiment of a resource authentication agent, the resource authentication agent receives a request to access the secure resource, and provides a confidence score request to the persistent authentication engine. In response to receiving the confidence score request, the resource authentication agent compares the confidence score with a resource confidence threshold to determine if the current confidence score is sufficient to access the secure resource. If so, the resource authentication agent unlocks the secure resource. If the confidence score is insufficient to access the secure resource, the resource authentication agent provides a reauthentication request. The reauthentication request can be handled by the persistent authentication engine or by another module to prompt the user to provide further credential information, thereby increasing the confidence score, and permitting the user to access the secure resource.

A second embodiment of a resource authentication agent is similar to the first embodiment, as described above, except that the resource authentication agent provides a request for the current authentication state of the information handling system from the persistent authentication engine, and where access to the secure resource and the reauthentication request are provided based upon the authentication state.

A third embodiment of a resource authentication agent receives the confidence score meta-data and provides access to the secure resource and the reauthentication request based upon the confidence score metadata. In this embodiment, the resource authentication agent has much more flexibility to tune the access criteria for the secure resource as needed or desired. For example, the confidence score metadata can include a time stamp for a most recent finger-print scan from the user, and if the time since the most recent finger-print scan exceeds a particular time limit, the resource authentication agent can provide the reauthentication request to receive a fresh finger-print scan, even if the confidence score is sufficient to provide access to the secure resource.

The resource authentication agents can reside on the information handling system or can be remote from the information handling system. Likewise, the secure resources that are accessed via the resource authentication agents can reside on the information handling system or can be remote from the information handling system.

FIG. 1 illustrates an authentication framework 100 including an information handling system 110 connected to a remote token storage 130, and to a remote resource authentication agent 140 that operates to provide access to a remote secure resource 145 to the information handling system. Information handling system 110 includes a capture device 112, a user interface device 114, a context engine 116, a recognition engine 118, a token storage 120, a persistent authentication engine 122, a resource authentication agent 124 and a secure resource 126. Capture device 112 represents one or more devices that provide particular input data to information handling system 110 that is adapted to verify the identity of a user of the information handling system. In particular, by interacting with capture device 112, a particular physical feature of the user is captured and compared with a copy of that physical feature that is know and verified to be associated with the user. An example of capture device 112 can include a special purpose device such as a finger-print scanner or an iris scanner, a general purpose device adapted to identify a particular physical feature, such as a touch screen adapted to identify a finger-print or a camera device adapted to scan a user's iris, or another device, as needed or desired.

User interface device 114 represents one or more general purpose device that can be utilized to perform various user identity validation functions, such as a keyboard/mouse upon which a user can provide log-in credentials like a username/password pair, an authenticated security token, such as may be employed on a plug-in dongle, a wireless device like a Near Field Communication device or Bluetooth device, another device suitable for identifying the user, or the like. Context engine 116 represents a wide variety of inputs which provide an identification of the context within which information handling system 110 is being utilized. For example, context engine 116 can represent one or more devices or software functions operable to identify a power management state of information handling system 110, such as a lid-open/lid-closed state for a laptop computer, a motion detector that detects that information handling system 110 has been picked up, operating system software that detects a task or application switch by the user, another context action or transaction, or the like. Recognition engine 118 represents a wide variety of inputs which provide an identification of the user of information handling system 110, such as facial recognition, key-stroke pattern recognition, other recognition modes, or the like. In particular, methods and devices that are suitable for use as one or more of capture device 112, user interface device 114, context engine 116, and recognition engine 118 are understood by the skilled artisan and particulars of such devices and engines will not be further disclosed herein.

Token storage 120 and remote token storage 130 operate to securely store one or more authenticated security tokens. The authenticated security tokens can be associated with multiple users, or with multiple devices 112 and 114, and engines 116 and 118. Secure resource 126 and remote secure resource 145 represent one or more hardware, software, program, or application resources that are restricted in their access, based upon a user's credentials. For example, secure resource 126 and remote secure resource 145 can include a storage volume or memory device, a program, a web application, another hardware or software item that is sought to be secured, or the like.

Capture device 112, user interface device 114, context engine 116, and recognition engine 118 are connected to persistent authentication engine 122 to provide information related to various authentication events, such as risk events, assurance events, context events, recognition events, and time-based events. In determining the identity of a user associated with the various authentication events, the user interacts with one or more of capture device 112, user interface device 114, context engine 116, and recognition engine 118 to provide a generated security token that is associated with the purported user. In a particular embodiment, the device 112 or 114, or engine 116 or 118 that provided the generated security token requests an authenticated security token that is associated with the purported user from one or more of token storage 120 and remote token storage 130, and, upon receipt of the authenticated security token, the requesting device or engine compares the authenticated security token to the generated security token to validate that the purported user is, in fact, a user that is authorized to utilize information handling system 110. If the purported user is validated to be the authorized user by the particular device 112 or 114, or engine 116 or 118, the device or engine provides an indication that the user is authorized to utilize information handling system 110. In a particular embodiment, the particular device 112 or 114, or engine 116 or 118 also provides an indication when the purported user is not validated to be the authorized user.

In another embodiment, the device 112 or 114, or engine 116 or 118 that provided the generated security token provides the generated security token to persistent authentication engine 122, and the persistent authentication engine requests the authenticated security token that is associated with the purported user from one or more of token storage 120 and remote token storage 130. Then, upon receipt of the authenticated security token, persistent authentication engine 122 compares the authenticated security token to the generated security token to validate that the purported user is, in fact, a user that is authorized to utilize information handling system 110. If the purported user is validated to be the authorized user, the persistent authentication engine 122 generates an internal indication that the user is authorized to utilize information handling system 110. In a particular embodiment, persistent authentication engine 122 also provides an internal indication when the purported user is not validated to be the authorized user.

Each act of validating the purported user as being authorized or not, constitutes a particular event, which, along with other events as described further below, is evaluated by persistent authentication engine 122 to generate confidence information, including a confidence score, an authentication state, and confidence score meta-data associated with the event information. Persistent authentication engine 122 operates to provide the confidence information to resource authentication agent 124 and to remote resource authentication agent 140.

Resource authentication agent 124 receives a request from the user of information handling system 110 to access secure resource 126. In response, resource authentication agent 124 requests the confidence information from persistent authentication engine 122, and determines, based upon one or more of the confidence score, the authentication state, or the confidence score meta-data, whether or not the user has sufficient authorization to access secure resource 126. If so, resource authentication agent 124 permits the user to access secure resource 126. If the user does not have sufficient authorization to access secure resource 126, then resource authentication agent 124 bars access to the secure resource to the user and requests persistent authentication engine 124 to solicit the user to provide additional information whereby the persistent authentication engine can increase one or more of the confidence score or the authentication state, or otherwise modify the confidence score meta-data such that the user is permitted to access secure resource 126. Remote resource authentication agent 140 operates similarly to resource authentication agent 124 to grant or deny access to remote secure resource 145. Here, persistent authentication engine 124 operates to provide the confidence information to remote resource authentication agent 140 via a network interface of information handling system 110. In this case, persistent authentication engine 122 can be securely linked to remote resource authentication agent 140, such as through a dedicated network connection, a Virtual Private Network (VPN), or another secure link. Moreover, that the communication between the persistent authentication engine and the remote resource authentication agent can be encrypted to provide additional security, such as via a public-key-infrastructure, a private key, or other encryption mechanism, as needed or desired.

Note that resource authentication agent 124 will be understood to control access to one or more additional secure resources, and that such additional secure resources can be local to information handling system 110, or remote there from. Likewise, remote resource authentication agent 140 will be understood to control access to one or more additional secure resources, and that such additional secure resources can be local to information handling system 110, or remote there from.

Figure 2:
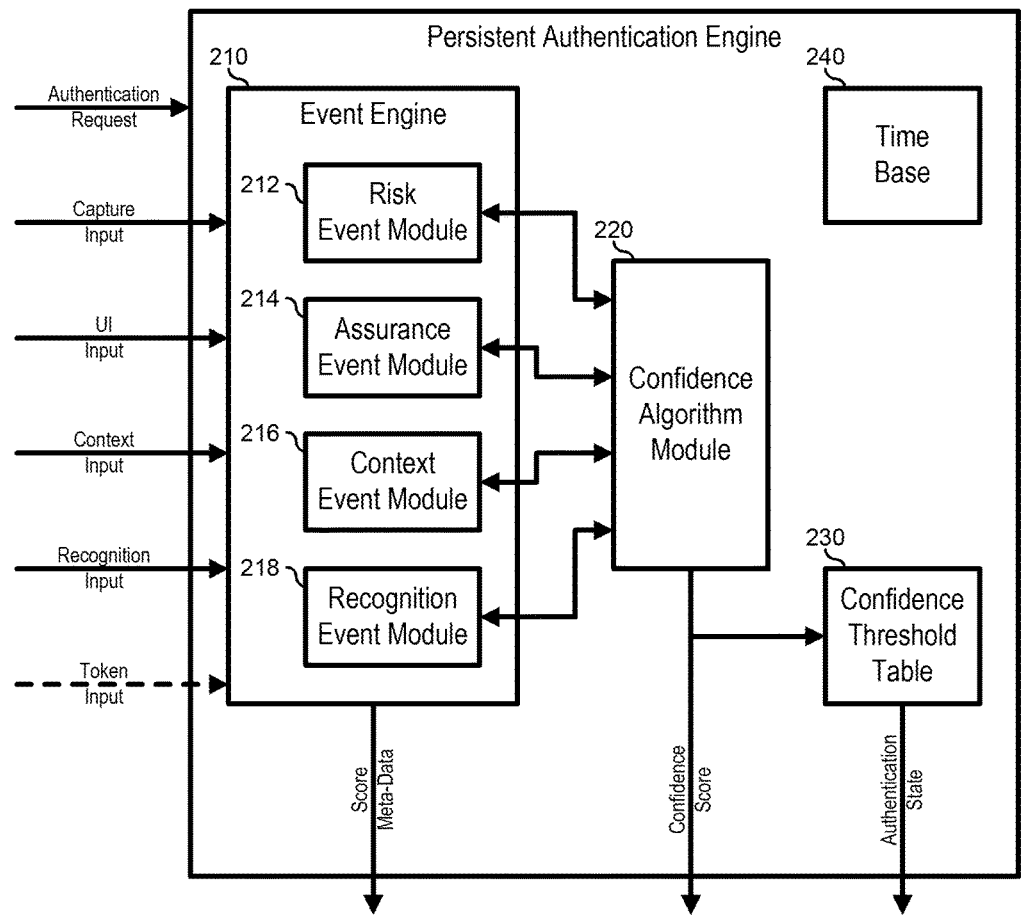
FIG. 2 is a block diagram of a persistent authentication engine of an information handling system in the authentication framework of FIG. 1.

FIG. 2 illustrates an embodiment of a persistent authentication engine 200, similar to persistent authentication engine 122, including an event engine 210, a confidence algorithm module 220, a confidence threshold table 230, and a time base 240. Persistent authentication engine 200 receives an authentication request from a resource authentication agent, a capture input from a capture device, a user interface input from a user interface device, a context input from a context engine, a recognition input, and a token input, and provides confidence score meta-data, a confidence score, and an authentication state. The authentication request includes requests for persistent authentication engine 200 to provide one or more of the confidence score meta-data, the confidence score, and the authentication state to the resource authentication agent, and requests for the persistent authentication agent to solicit a user to provide additional information whereby the persistent authentication engine can increase one or more of the confidence score or the authentication state, or otherwise modify the confidence score meta-data such that the user is permitted to access a secure resource.

In a particular embodiment, the capture input, the user interface input, the context input, and the recognition input represent indications that a user is authorized to utilize the information handling system, or that the particular device or engine determined that the purported user is not validated to be the authorized user. In another embodiment, the capture input, the user interface input, the context input, and the recognition input represents a generated security token, and event engine 210 requests an authenticated security token that is associated with the purported user from a token storage. Event engine 210 receives the authenticated security token on the token input and compares the authenticated security token to the generated security token to validate that the purported user is, in fact, a user that is authorized to utilize the information handling system. If the purported user is validated to be the authorized user, event engine 200 generates an internal indication that the user is authorized to utilize the information handling system. In a particular embodiment, persistent authentication engine 200 also provides an internal indication when the purported user is not validated to be the authorized user.

Event engine 210 determines whether information provided by capture input, user interface input, context input, and recognition input constitute one of several different types of events. In particular, event engine 210 includes a risk event module 212 to determine if an input constitutes a risk event, an assurance event module 214 to determine if an input constitutes a assurance event, a context event module 216 to determine if an input constitutes a context event, and a recognition event module 218 to determine if an input constitutes a recognition event. As noted above, risk events are actions or events on the information handling system which tend to decrease the confidence that a current user of the information handling system is the same as the user who initiated a session on the information handling system. An example of a risk event includes a long idle time may, a failed authentication attempt, a change to the WiFi SSID for the information handling system, a change in a MAC address for the information handling system, a change to the facial recognition pattern detected by the information handling system, another similar occurrence, or a combination thereof. Assurance events are actions or events which tend to increase the confidence that the current user is the same as the user who initiated the session, and includes initial logon and authentication activities, swipe pattern unlock activities, and the like. Context events are actions or events on the information handling system that indicate that an operating state of the information handling system has changed, such as the opening or closing of a laptop computer. Recognition events are actions or events which lend credibility to the identity of the authenticated user, such as various pattern recognition activities. Note that some types of actions or events can be considered as more than one of a risk event, an assurance event, a context event, and a recognition event, as needed or desired.

Information related to the determinations made by modules 212-218 is provided as confidence score meta-data to one or more resource authentication agent that can use the confidence score meta-data to craft a customizable authentication scheme, as described further, below. In particular, the confidence score meta-data can include such information as log-in attempts and whether or not the log-in attempts were successful, a time stamp from time base 240 as to when a log-in attempt was performed or how many log-in attempts were tried in a particular amount of time. The confidence score meta-data can also include a time stamp indicating the freshness of a particular assurance event. Further, the confidence score meta-data can include information as to the source of a context event, such as whether a context switch was instituted by a user, software, or another device of the information handling system. Moreover, the confidence score meta-data can include information as to a degree of confidence included in a particular recognition event, such as a percent match on a facial recognition event.

The information related to the determinations made by event modules 212-218 is also provided to confidence algorithm module 220. Confidence algorithm module 220 operates to determine a confidence score that measures the level of confidence that a current user of the information handling system is an authenticated user and is the same as the user who initiated the session on the information handling system. In a particular embodiment, the confidence score is provided in terms of a percentage, from 0% to 100% confidence. In another embodiment, the confidence score is provided on a numbered scale, such as from 0-10, where zero (0) is a low confidence level and ten (10) is a high confidence level. Hereinafter, the confidence level shall be described in terms of a percentage confidence level. Confidence algorithm module 220 can represent an equation with inputs from event modules 212-218 and time base 240 that calculates the confidence score, can represent a set of rules that correlate the event modules' and time base inputs to the confidence score, or can represent a combination of an equation and a set of rules.

Figure 3:
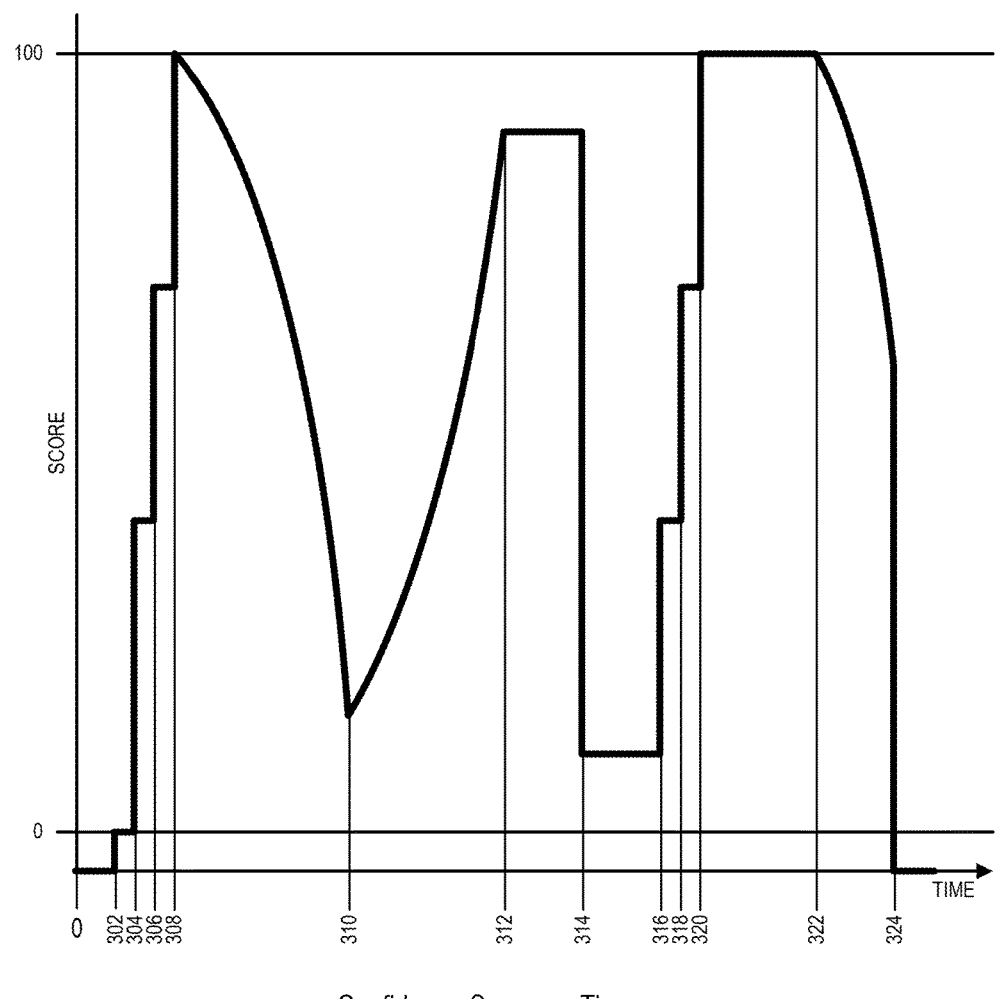
FIG. 3 is a graph of a confidence score generated by the persistent authentication engine of FIG. 2.

FIG. 3 is a graph 300 of an exemplary confidence score generated by persistent authentication engine 200 which illustrates the operation of confidence algorithm module 220. At time "0," the information handling system is unaware of any user interaction. This state can represent a power off state, a suspended state, a sleep state, a hibernation state, or another such state, as needed or desired. At time 302, the information handling system is set into a state that is prepared to receive a user input, such as by powering on the information handling system, resuming from the suspended state, waking from the sleep or hibernation state, or otherwise preparing the information handling system to receive a user input, as needed or desired. However, before receiving any user inputs, the confidence score is initially 0%. That is, no user has been identified on the information handling system.

At this point, the information handling system can prompt a user to provide one or more authentication credentials, such as a username/password log-on, an iris scan log-on, a finger-print scan log-on, another authentication credential, or a combination thereof, as needed or desired. For example, at time 304, the user can successfully provide a username/password log-on credential, and confidence algorithm module 220 can ascribe a 40% confidence score to a successful username/password log-on attempt, and so the confidence score is increased to 40%. Next, at time 306, the user can successfully provide an iris scan credential, and confidence algorithm module 220 can ascribe a 30% confidence score to a successful iris scan attempt, and so the confidence score is increased to 70%. Finally, at time 308, the user can successfully provide a finger-print scan log-on credential, and confidence algorithm module 220 can ascribe a 30% confidence score to a successful finger-print scan attempt, and so the confidence score is increased to 100%.

In a particular embodiment, confidence engine 220 can ascribe a variable confidence score to one or more type of assurance event. For example, in some cases, a credential can be provided locally at the information handling system, from a non-secure remote resource, such as an un-trusted web server, and also from a secure remote resource, such as a trusted web server. Here, confidence engine 220 can ascribe a base level confidence score to a credential that is provided locally. For example, a username/password log-on that is provided locally can be ascribed a 40% confidence score. On the other hand, confidence engine 220 can ascribe a discounted confidence score to a credential that is provided from a non-secure remote source. For example, a username/ password log-on that is provided from an un-trusted web server can be ascribed a 25% confidence score. Finally, confidence engine 220 can ascribe a premium confidence score to a credential that is provided from a secure remote source. For example, a username/password log-on that is provided from a trusted web server can be ascribed a 50% confidence score. Note that such grading of assurance events can be provided in confidence engine 220 on a case-by-case basis, where each type of assurance event and source combination is given a set discount or premium, as needed or desired. The grading of assurance events can also be provided as a blanket rule. Here, a fixed discount or premium can be applied to the assurance events. The fixed discount or premium can be defined as a set score adder, or can be defined as a percentage of the base confidence level.

At time 308, after having successfully provided credentials to increase the confidence score to 100%, the user provides no additional input to the information handling system for a time, causing confidence algorithm module 220 to reduce the confidence score. In a particular embodiment, the confidence score can be decreased linearly with time, exponentially with time, or according to another relationship with non-activity. In another embodiment, confidence algorithm module 220 can permit a dwell time, such as one minute, thirty seconds, or another dwell time, before the confidence score begins to decrease.

At time 310, the user begins using the information handling system and the confidence score begins a region of passive authentication. Here, various recognition events are provided to confidence algorithm module 220 that lend increased validity to the user. For example, in the time span between time 308 and 310, the user may have stepped away from the information handling system, while after time 310, the user may have returned. Here, when the user returned, facial recognition software may provide increased confidence that the user is the authenticated user, or usage patterns may such confidence, and so confidence algorithm module 220 increases the confidence score. Because the user provides no affirmative log-in credentials during this time, but the confidence score is increasing, this region is called passive authentication. In a particular embodiment, the confidence score can only increase to a certain level due to passive authentication. Here, at time 312, the confidence score has been increased to 90% due to various passive authentication activities by the user, but confidence algorithm module 220 does not increase the confidence score beyond 90%.

At time 314, the user performs a reverse authentication event. Here, confidence algorithm module 220 provides a large decrease in the confidence score in response to the event. In a particular embodiment, the decrease in the confidence score is provided as a particular confidence level, such as 10%, as a percentage rule, such as—(reduce the current confidence score by 90%), as a score rule, such as—(reduce the current confidence score by 75), or by another reduction method as needed or desired. A particular example of a reverse authentication event is the placing of the information handling system into a shared mode, as described further, below. Another example of a reverse authentication event includes detection of a particular gesture or voice command, a keyboard sequence, such as CTL-ALT-DEL, loss of network, WiFi, or Bluetooth connection, another event, or a combination thereof. In a particular embodiment, confidence algorithm module 220 can provide for different levels of reverse authentication events, such that a first event triggers a small decrease in the confidence score, a second event triggers a larger decrease in the confidence score, and so forth.

At times 316, 318, and 320, the user provides authentication credentials similarly to times 304, 306, and 308, as described above, and confidence algorithm module 220 increases the confidence score back to 100%. After time 320, the user proceeds to utilize the information handling system and so the confidence level remains at 100%. At time 322, the user quits using the information handling system, and confidence algorithm module 220 begins to reduce to confidence score, as described above. At time 324, the user shuts down the information handling system, such that the information handling system is unaware of any user input, and the confidence score drops to 0%.

Figure 4:
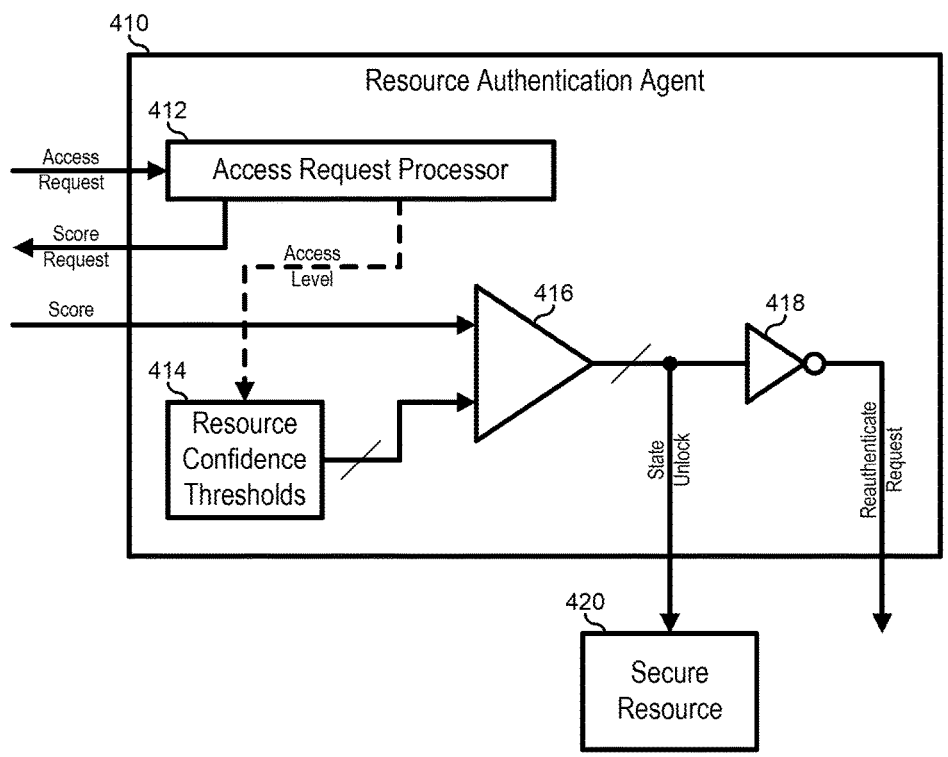
FIG. 4 is a block diagram of a resource authentication agent of the information handling system in the authentication framework of FIG. 1, according to an embodiment of the present disclosure.

FIG. 4 illustrates a first embodiment of a resource authentication agent 410 that controls the access to a secure resource 420. Resource authentication agent 410 includes an access request processor 412, a resource confidence threshold table 414, a comparator 416, and an inverter 418. Resource authentication agent 410 receives a request to access secure resource 420 from a user. The request can represent a gradation of requests to access secure resource 420. For example, where secure resource 420 is a file, a particular request can be to receive read access to the secure resource, to receive read/write access to the secure resource, to receive read/write and create/delete access to the secure resource, or to receive other types of access as needed or desired. Access request processor 412 operates to provide a confidence score request to a persistent authentication engine, and to provide an access level indication to resource confidence threshold table 414.

Resource confidence threshold table 414 includes one or more confidence level threshold. Each confidence level threshold defines a confidence level score needed in order to access a particular function of feature of secure resource 420. In response to the request for the current confidence score, the persistent authentication engine provides the current confidence score to resource authentication agent 410, and the resource authentication agent compares the confidence score with selected resource confidence threshold from resource confidence threshold table 414 to determine if the current confidence score is sufficient to access the secure resource. The resource confidence level is selected by access request processor 412, based upon the level of access to secure resource 420 that is requested. For this reason, the output of resource confidence threshold table 414 is illustrated as a multiple output.

If the confidence score is greater than the selected resource confidence threshold, resource authentication agent 410 unlocks secure resource 420 to a level specified by the selected resource confidence threshold. If the confidence score is less than the selected resource confidence threshold, resource authentication agent 410 provides a reauthentication request by inverting the output of comparator 416 with inverter 418. The reauthentication request can be handled by the persistent authentication engine or by another module to prompt the user to provide further credential information, thereby increasing the confidence score, and permitting the user to access the secure resource. In a particular embodiment, when resource authentication agent 410 unlocks secure resource 420, the resource authentication agent provides an indication to the persistent authentication engine that the secure resource has been unlocked for the user. Note that the illustration of resource authentication agent 410, and particularly comparator 416 and inverter 418, are here illustrative of functional operations as described above, and are not intended to depict a particular circuit implementation, although such is not precluded herein.

Returning to FIG. 2, persistent authentication module 200 further operates to provide the confidence score to confidence threshold table 230. Confidence threshold table 230 includes one or more confidence level threshold. Each confidence level threshold defines an authentication state for the information handling system. Here, the confidence level thresholds as included in confidence threshold table 230 is similar to the confidence level threshold as included in resource confidence threshold table 414, as described above, except that the confidence level thresholds of confidence threshold table 230 are applied globally to the information handling system, while the confidence level threshold of the resource confidence threshold table are specific to secure resource 420.

Persistent authentication engine 200 provides the current confidence score to confidence threshold table 230, and the confidence threshold table compares the confidence score with the confidence level thresholds to determine the authentication level for the information handling system. For example, when the confidence score is below a particular threshold, the information handling system may be defined as being in a Restricted state, when the confidence score is above a second threshold, the information handling system may be defined as being in a Transactional state, and when the confidence score is between the two thresholds, the information handling system may be defined as being in an Authenticated state. The user's ability to access and interact with various resources of the information handling system can be determined by the confidence score or by the authentication state.

In a particular embodiment, the values stored in confidence threshold table 230 are pre-determined, such as by a hardware, firmware, or BIOS setting of the information handling system. In another embodiment, the values stored in confidence threshold table 230 are selectable, such as by a user with administrative privileges to the information handling system, or through a BIOS setting. In yet another embodiment, confidence threshold table 230 represents more than one set of confidence level thresholds, each set being associated with a different resource authentication agent, and different authentication states can be provided to each associated resource authentication agent based upon its associated set of confidence level thresholds. Here, the different sets of confidence level thresholds can be pre-determined, or can be provided by the associated resource authentication agent.

Figure 5:
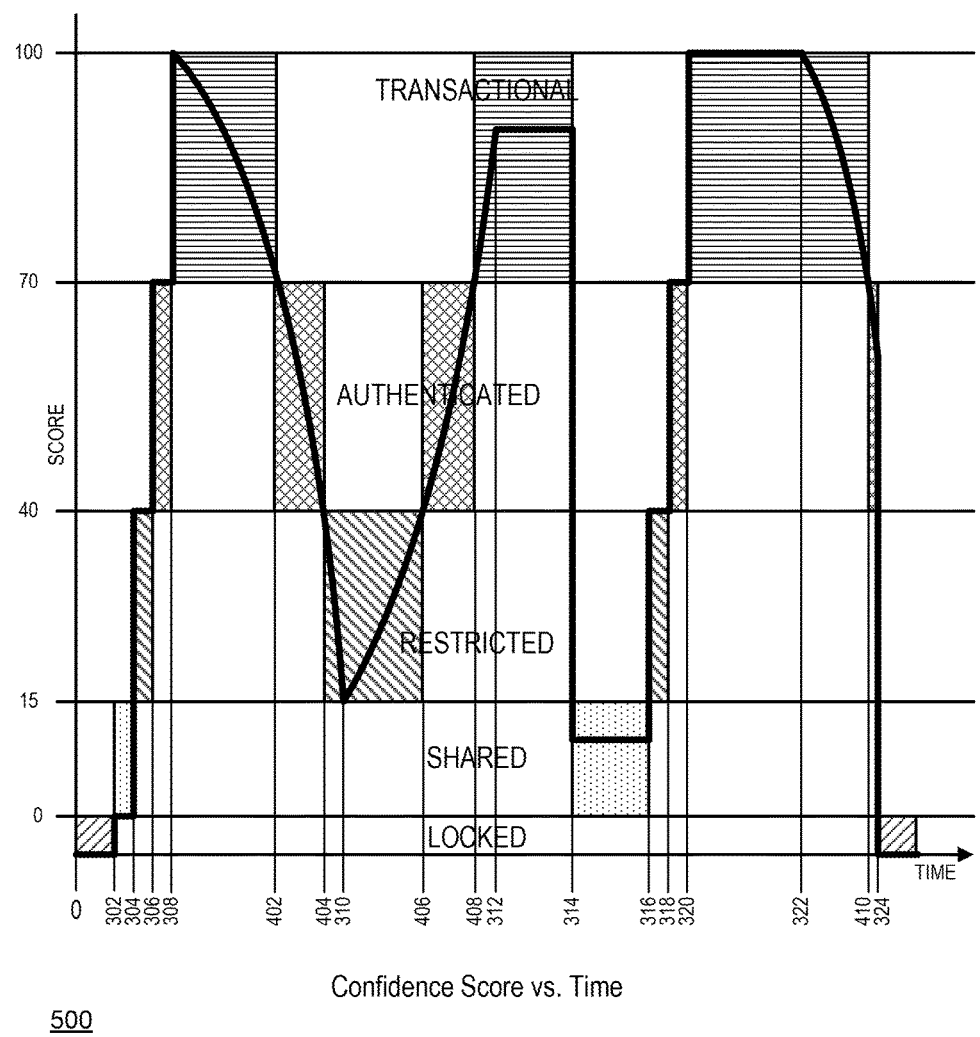
FIG. 5 is a graph of the confidence score generated by the persistent authentication engine of FIG. 2, including current authentication state information associated with the confidence score, according to an embodiment of the present disclosure.

FIG. 5 is a depiction of a graph 500 similar to graph 300, with exemplary authentication states overlaid. In particular, graph 500 illustrates a Locked state where the information handling system is unaware of any user interaction, a Shared state between 0% and 15%, a Restricted state between 15% and 40%, an Authenticated state between 40% and 70%, and a Transactional state between 70% and 100%. Here, the information handling system starts in the Locked state at time 0 and enters the Shared state at time 302. The authentication events marked by times 304, 306, and 308 successively transition the information handling system to the Restricted state, the Authenticated state, and the Transactional state.

After time 308, when confidence algorithm module 220 reduces the confidence score, the authentication state is reduced to the Authenticated state when the confidence score is reduced to 70% at time 402, and to the Restricted state when the confidence score is reduced to 40% at time 404. During the passive authentication, when confidence algorithm module 220 increases the confidence score, the authentication state is increased back to the Authenticated state when the confidence score is increased to 40%, and to the Transactional state when the confidence score is increased to 70%.

The information handling system remains in the Transactional state until time 314, when the reverse authentication event drops the confidence score to 10%, at which time the information handling system enters the Shared state. At times 316, 318, and 320, when the re-authentication events occur, the information handling system successively transitions to the Restricted state, the Authenticated state, and the Transactional state. The information handling system remains in the Transactional state until the confidence score hits 70%, at time 410, and the information handling system is returned to the Locked state at time 324 when the information handling system is shut down.

As noted above, in the Locked state, the information handling system is unaware of any user interaction. In the Shared state, access is only provided to resources which do not require any authentication credentials. For example, the Shared state can permit the use of cellular telephone functions of a mobile device, games, and the like. In the Restricted state, access is provided to low-confidence level resources, such as web browsing, file read access, or the like, but access to secure resources may be limited, such as download restrictions, or no-write and no-create/delete access. In the Authenticated state, access is provided to medium-confidence level resources, such as web downloading of files, but not of executables, or file read/write access. Finally, in the Transactional state, full access is provided to all high-confidence level resources, such as all downloading, create/delete file access, system configuration, and the like.

Figure 6:
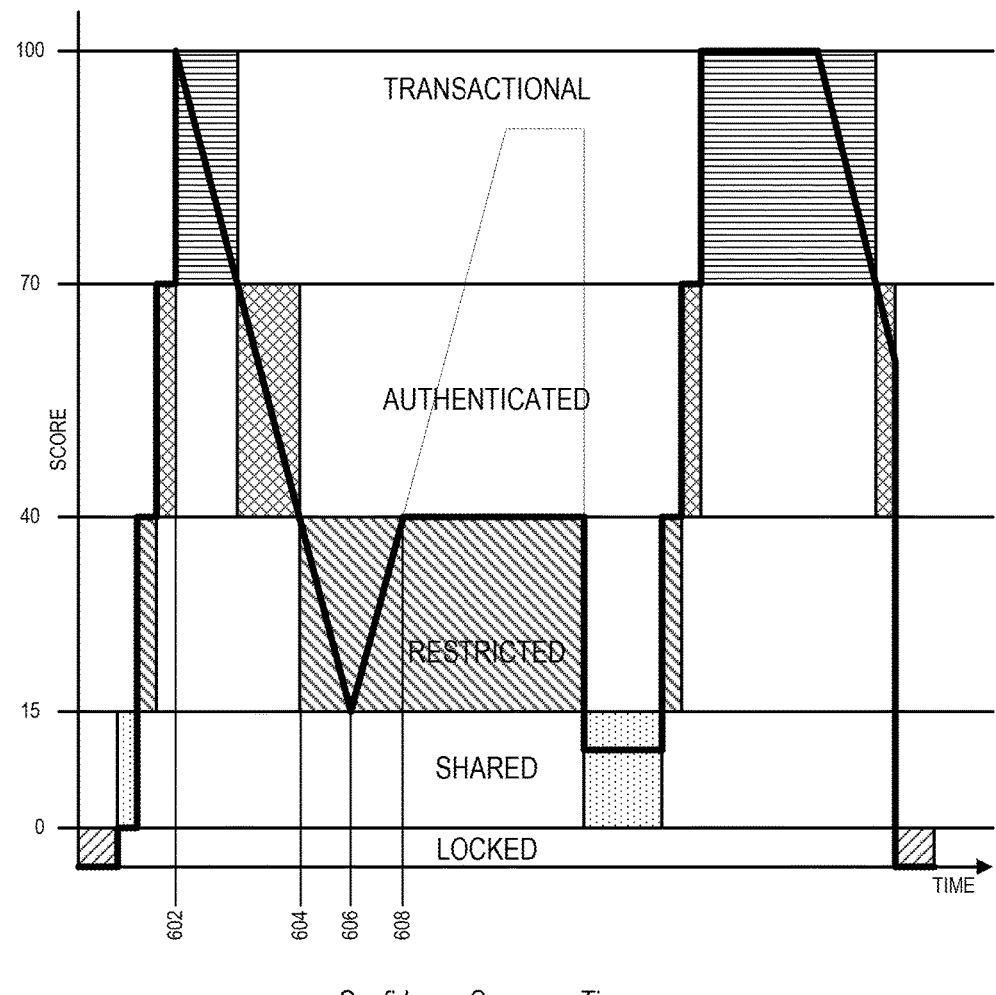
FIG. 6 is a graph of the confidence score generated by the persistent authentication engine of FIG. 2, including current authentication state information associated with the confidence score, according to another embodiment of the present disclosure.

FIG. 6 is a depiction of a graph 600 similar to graph 500, with exemplary authentication states overlaid. In particular, graph 600 illustrates an embodiment where passive authentication is only permitted to raise the confidence score to the limit of the present authentication state. Here, confidence algorithm module 220 begins to decrease the confidence score at time 602, and the confidence score decreases through the Transactional state and the Authenticated state, and enters the Restricted state at time 604. At time 606, the user begins to interact with the information handling system, and the passive authentication begins to cause confidence algorithm module 220 to increase the confidence score. Here, the fine line illustrates what the confidence score would be if there were no limit on increasing the authentication state through passive authentication. However, because of the limitation that the authentication state is not permitted to increase due to the passive authentication, the confidence score remains at 40% at time 608, and the information handling system remains in the Restricted state, rather than increasing through the Authenticated state and the Transactional state. In a particular embodiment, the limitation upon changing state due to passive authentication can be applied on a state-by-state basis. For example, passive authentication may be permitted to raise the confidence score from the Shared state to the Restricted state, or passive authentication may be permitted to raise the confidence score from the Authenticated state to the Transactional state, and only the transition from the Restricted state to the Authenticated state may be denied. Note that the foregoing example assumes that transitions can only be made between adjacent authentication states, but this is not necessarily so, and the skilled artisan will recognize that other particular cases can be envisioned where transitions between non-adjacent states are allowed.

Figure 7:
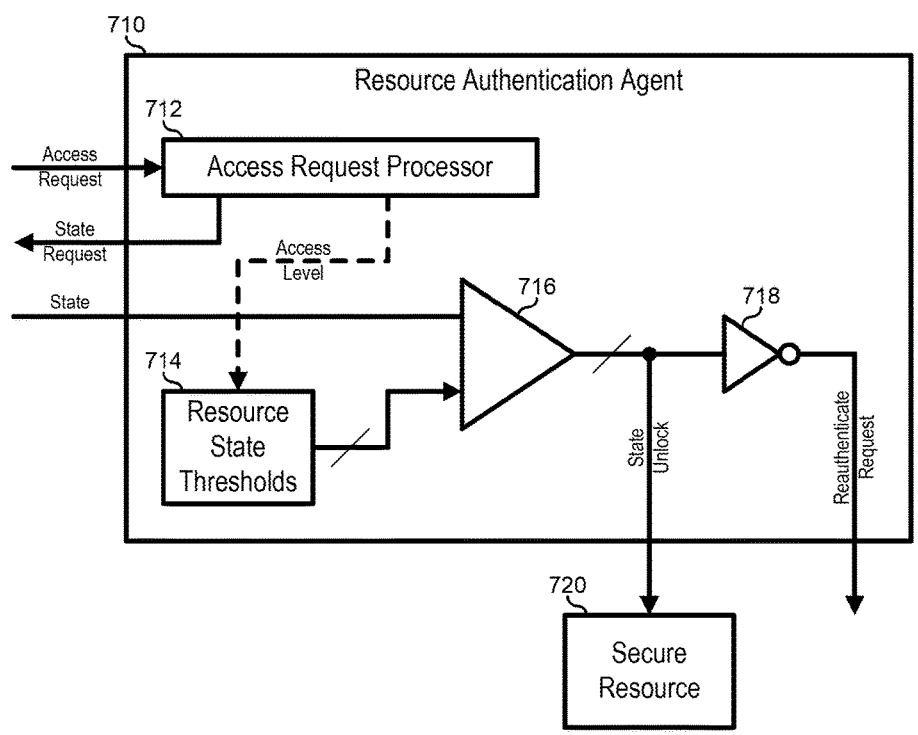
FIG. 7 is a block diagram of another embodiment of a resource authentication agent of the information handling system in the authentication framework of FIG. 1.

FIG. 7 illustrates a second embodiment of a resource authentication agent 710 that controls the access to a secure resource 720. Resource authentication agent 710 includes an access request processor 712, a resource state threshold table 714, a comparator 716, and an inverter 718. Resource authentication agent 710 receives a request to access secure resource 720 from a user. The request can represent a gradation of requests to access secure resource 720. Access request processor 712 operates to provide an authentication state request to a persistent authentication engine, and to provide an access level indication to resource state threshold table 714.

Resource state threshold table 714 includes a state map that maps the various authentication states with the permitted level of access to secure resource 720. In response to the request for the current authentication state, the persistent authentication engine provides the authentication state to resource authentication agent 710, and the resource authentication agent compares the authentication state with selected entry of the state map of resource state threshold table 714 to determine if the current authentication state is sufficient to access secure resource 720. If the authentication state is greater than or equal to the selected resource state threshold, resource authentication agent 710 unlocks secure resource 720 to a level specified by the selected resource score threshold. If the authentication state is less than the selected resource state threshold, resource authentication agent 710 provides a reauthentication request by inverting the output of comparator 716 with inverter 718. The reauthentication request can be handled by the persistent authentication engine or by another module to prompt the user to provide further credential information, thereby increasing the confidence score, and permitting the user to access the secure resource. In a particular embodiment, when resource authentication agent 710 unlocks secure resource 720, the resource authentication agent provides an indication to the persistent authentication engine that the secure resource has been unlocked for the user. Note that the illustration of resource authentication agent 710, and particularly comparator 716 and inverter 718, are here illustrative of functional operations as described above, and are not intended to depict a particular circuit implementation, although such is not precluded herein.

Figure 8:
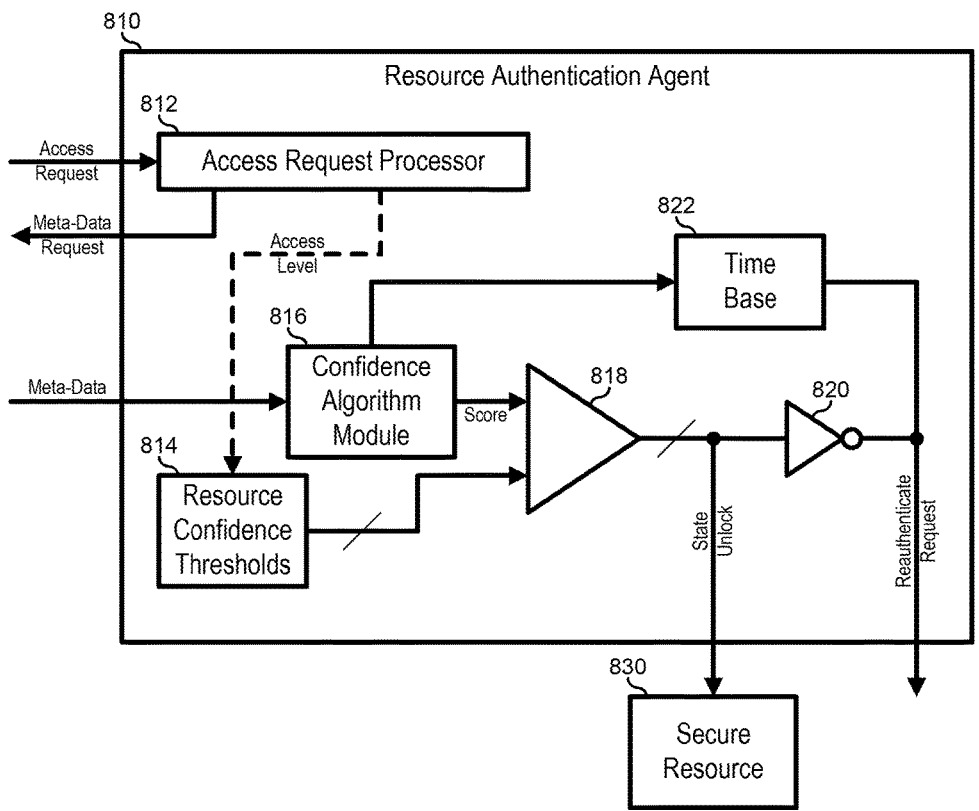
FIG. 8 is a block diagram of another embodiment of a resource authentication agent of the information handling system in the authentication framework of FIG. 1.

FIG. 8 illustrates a third embodiment of a resource authentication agent 810 that controls the access to a secure resource 830. Resource authentication agent 810 includes an access request processor 812, a resource confidence threshold table 814, a confidence algorithm module 816, a comparator 818, an inverter 820, and a time base 822. Resource authentication agent 810 receives a request to access secure resource 830 from a user. The request can represent a gradation of requests to access secure resource 830. Access request processor 812 operates to provide a confidence score meta-data request to a persistent authentication engine, and to provide an access level indication to resource confidence threshold table 814.

Resource confidence threshold table 814 includes one or more confidence level threshold that defines a confidence level score needed in order to access a particular function of feature of secure resource 830. In response to the request for the current confidence score meta-data, the persistent authentication engine provides the current confidence score meta-data to confidence algorithm module 816. Confidence algorithm module 816 is similar to confidence algorithm module 220, and uses the confidence score meta-data to determine a confidence score. Here the confidence score determined by confidence algorithm module 816 can be calculated in the same way as the confidence score from the persistent authentication engine, that is, based upon a same equation or set of rules, or can be calculated differently from the confidence score from the persistent authentication engine.

Confidence algorithm module 816 provides the confidence score to comparator 818 and the comparator compares the confidence score with a selected resource confidence threshold from resource confidence threshold table 814 to determine if the current confidence score is sufficient to access the secure resource. The resource confidence level is selected by access request processor 812, based upon the level of access to secure resource 830 that is requested. For this reason, the output of resource confidence threshold table 814 is illustrated as a multiple output.

If the confidence score is greater than the selected resource confidence threshold, resource authentication agent 810 unlocks secure resource 830 to a level specified by the selected resource confidence threshold. If the confidence score is less than the selected resource confidence threshold, resource authentication agent 810 provides a reauthentication request by inverting the output of comparator 818 with inverter 820. The reauthentication request can be handled by the persistent authentication engine or by another module to prompt the user to provide further credential information, thereby increasing the confidence score, and permitting the user to access the secure resource. In a particular embodiment, when resource authentication agent 810 unlocks secure resource 830, the resource authentication agent provides an indication to the persistent authentication engine that the secure resource has been unlocked for the user.

In a particular embodiment, confidence algorithm module 816 operates to provide the confidence score meta-data to time base 822 to determine if an assurance event has gone stale. That is, time base 822 applies a time limit to one or more assurance events. For example, time base 822 can provide a time limit for receiving finger-print scan authentication credentials, such that, if no finger-print scan authentication credential has been received within the previous hour, then time base 822 issues a reauthentication request. Here, notwithstanding a confidence score that, based upon the confidence score meta-data alone, would indicate that secure resource 830 should be unlocked, resource authentication agent 810 will maintain the lock on secure resource 820 until such time as a fresh finger-print scan authentication credential is received by the persistent authentication engine, and the confidence score meta-data is updated to reflect that fact.

Because resource authentication agent 810 includes its own confidence algorithm module 816, the resource authentication agent has a high degree of flexibility to manage and control the conditions under which secure resource 830 is unlocked. Note that the illustration of resource authentication agent 810, and particularly comparator 818, inverter 820, and time base 822, are here illustrative of functional operations as described above, and are not intended to depict a particular circuit implementation, although such is not precluded herein.

Figure 9:
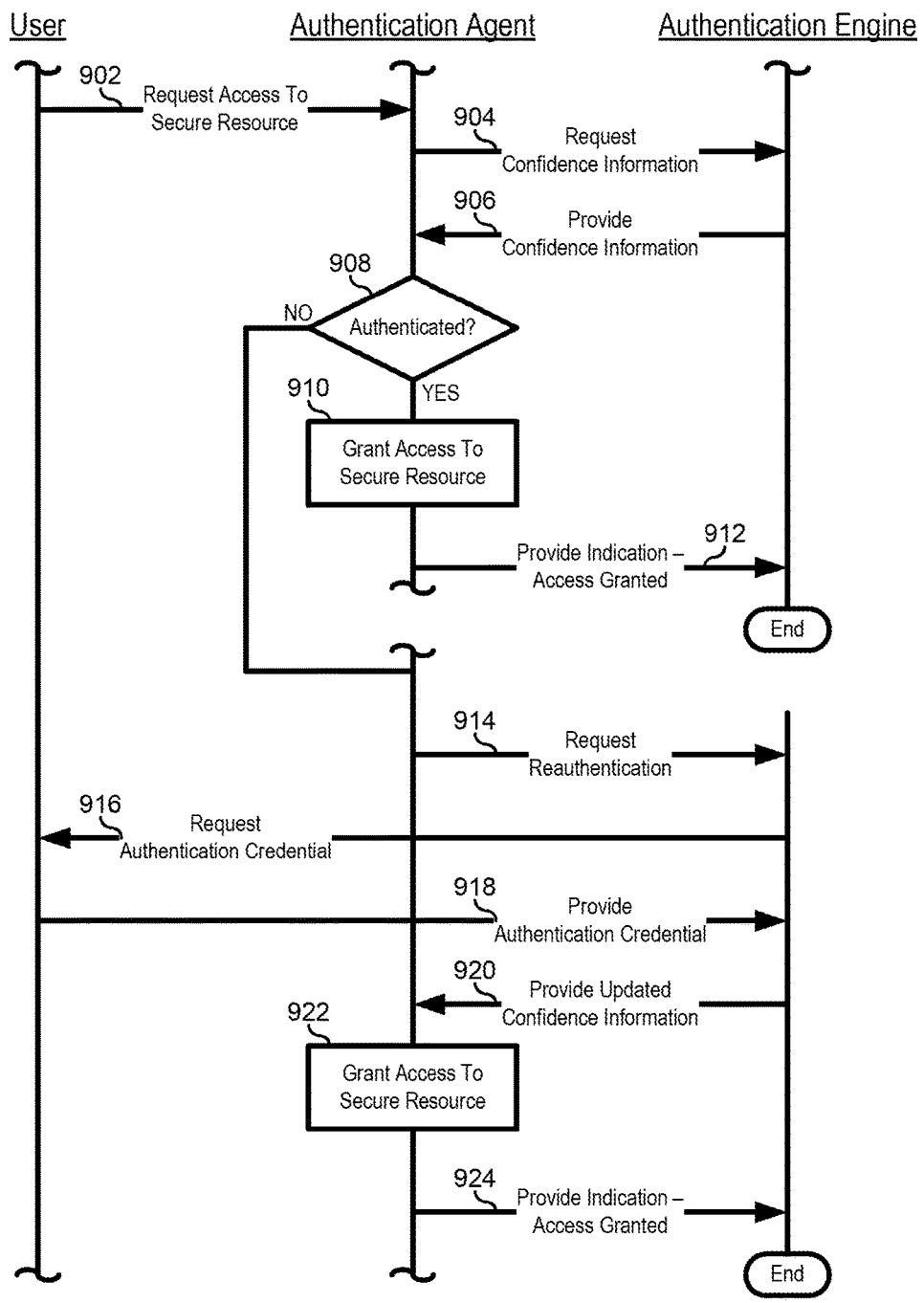
FIG. 9 is a flowchart illustrating a method of providing persistent authentication on an information handling system according to an embodiment of the present disclosure.

FIG. 9 illustrates a method of providing persistent authentication on an information handling system, starting at step 902 where a user requests access to a secure resource of the information handling system from a resource authentication agent. In step 904, the resource authentication agent responds to the access request from the user by requesting confidence level information from a persistent authentication engine. For example, the resource authentication agent can request a confidence score, an authentication state, or confidence score meta-data from the persistent authentication engine. The persistent authentication engine provides the requested authentication information to the resource authentication agent in step 906.

The resource authentication agent determines if the user is authenticated to a sufficient level to grant access to the secure resource in decision block 908. For example, the resource authentication agent can compare the confidence score or the authentication state with score or state thresholds, or can derive a confidence score from the confidence score meta-data to compare with the score threshold, in order to determine if the user is authenticated to the sufficient level. If so, the "YES" branch of decision block 908 is taken, the resource authentication agent grants the user access to the secure resource in block 910 and provides an indication to the persistent authentication engine that the access to the secure resource was granted to the user in step 912, and the method ends.

If the user is not authenticated to the sufficient level to grant access to the secure resource, the "NO" branch of decision block 908 is taken and the resource authentication agent provides a reauthentication request to the persistent authentication engine in step 914. The persistent authentication engine prompts the user to provide an additional authentication credential in step 916. For example, the user can be prompted to provide a username/password log-on, a finger-print or iris scan, or another authentication credential. The user provides the additional authentication credential to the persistent authentication engine in step 918. The persistent authentication engine provides the updated confidence information based upon the additional authentication credential to the resource authentication agent in step 920. The resource authentication agent grants the user access to the secure resource in block 922, provides an indication to the persistent authentication engine that the access to the secure resource was granted to the user in step 924, and the method ends.

Figure 10:
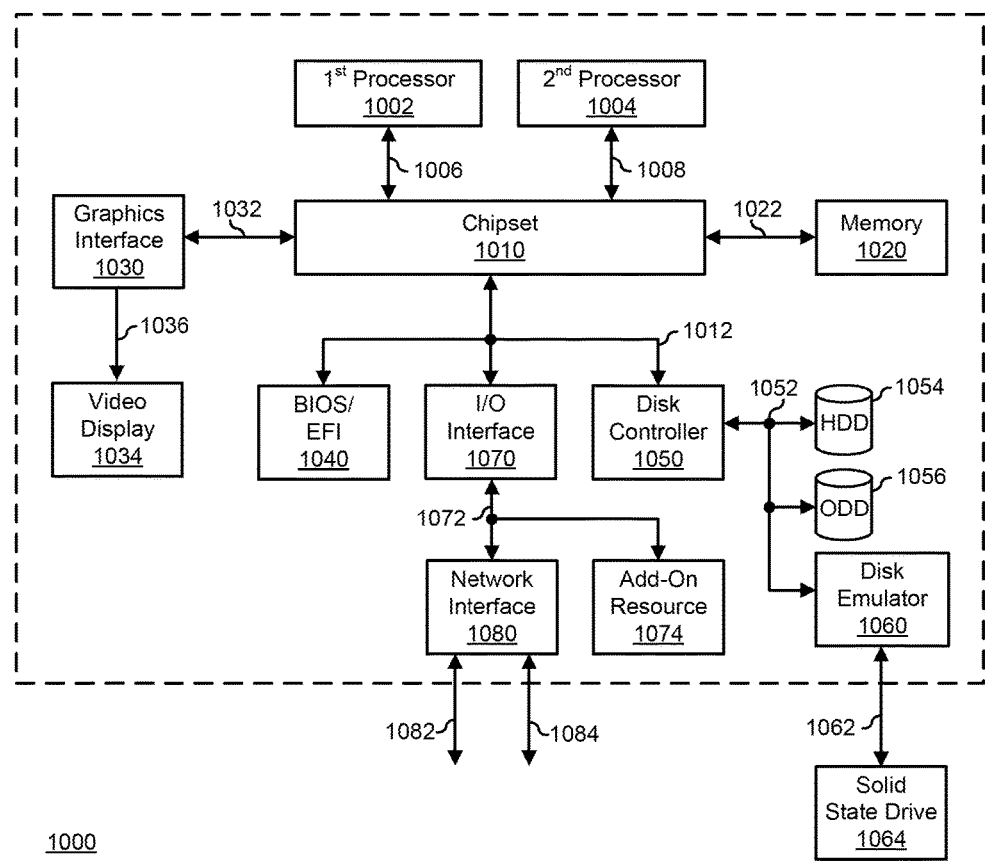
FIG. 10 is a block diagram illustrating a generalized information handling system according to an embodiment of the present disclosure.

FIG. 10 illustrates a generalized embodiment of information handling system 1000. For purpose of this disclosure information handling system 1000 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 1000 can also include one or more computer-readable medium for storing machine-executable code, such as software or data. Additional components of information handling system 1000 can include one or more storage devices that can store machine-executable code, one or more communications ports for communicating with external devices, and various input and output (I/O) devices, such as a keyboard, a mouse, and a video display. Information handling system 1000 can also include one or more buses operable to transmit information between the various hardware components.

Information handling system 1000 can include devices or modules that embody one or more of the devices or modules described above, and operates to perform one or more of the methods described above. Information handling system 1000 includes processors 1002 and 1004, a chipset 1010, a memory 1020, a graphics interface 1030, include a basic input and output system/extensible firmware interface (BIOS/EFI) module 1040, a disk controller 1050, a disk emulator 1060, an input/output (I/O) interface 1070, and a network interface 1080. Processor 1002 is connected to chipset 1010 via processor interface 1006, and processor 1004 is connected to the chipset via processor interface 1008. Memory 1020 is connected to chipset 1010 via a memory bus 1022. Graphics interface 1030 is connected to chipset 1010 via a graphics interface 1032, and provides a video display output 1036 to a video display 1034. In a particular embodiment, information handling system 1000 includes separate memories that are dedicated to each of processors 1002 and 1004 via separate memory interfaces. An example of memory 1020 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 1040, disk controller 1050, and I/O interface 1070 are connected to chipset 1010 via an I/O channel 1012. An example of I/O channel 1012 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1010 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 1040 includes BIOS/EFI code operable to detect resources within information handling system 1000, to provide drivers for the resources, initialize the resources, and access the resources. BIOS/EFI module 1040 includes code that operates to detect resources within information handling system 1000, to provide drivers for the resources, to initialize the resources, and to access the resources.

Disk controller 1050 includes a disk interface 1052 that connects the disc controller to a hard disk drive (HDD) 1054, to an optical disk drive (ODD) 1056, and to disk emulator 1060. An example of disk interface 1052 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1060 permits a solid-state drive 1064 to be connected to information handling system 1000 via an external interface 1062. An example of external interface 1062 includes a USB interface, an IEEE 1394 (Firewire) interface, a proprietary interface, or a combination thereof. Alternatively, solid-state drive 1064 can be disposed within information handling system 1000.

I/O interface 1070 includes a peripheral interface 1072 that connects the I/O interface to an add-on resource 1074 and to network interface 1080. Peripheral interface 1072 can be the same type of interface as I/O channel 1012, or can be a different type of interface. As such, I/O interface 1070 extends the capacity of I/O channel 1012 when peripheral interface 1072 and the I/O channel are of the same type, and the I/O interface translates information from a format suitable to the I/O channel to a format suitable to the peripheral channel 1072 when they are of a different type. Add-on resource 1074 can include a data storage system, an additional graphics interface, a network interface card (NIC), a sound/video processing card, another add-on resource, or a combination thereof. Add-on resource 1074 can be on a main circuit board, on separate circuit board or add-in card disposed within information handling system 1000, a device that is external to the information handling system, or a combination thereof.

Network interface 1080 represents a NIC disposed within information handling system 1000, on a main circuit board of the information handling system, integrated onto another component such as chipset 1010, in another suitable location, or a combination thereof. Network interface device 1080 includes network channels 1082 and 1084 that provide interfaces to devices that are external to information handling system 1000. In a particular embodiment, network channels 1082 and 1084 are of a different type than peripheral channel 1072 and network interface 1080 translates information from a format suitable to the peripheral channel to a format suitable to external devices. An example of network channels 1082 and 1084 includes InfiniBand channels, Fibre Channel channels, Gigabit Ethernet channels, proprietary channel architectures, or a combination thereof. Network channels 1082 and 1084 can be connected to external network resources (not illustrated). The network resource can include another information handling system, a data storage system, another network, a grid management system, another suitable resource, or a combination thereof.

The skilled artisan will recognize that, where a particular device type, standard, or operation is specified, that suitable alternatives as needed or desired can be incorporated along with the teachings herein. For example, where the present disclosure describes network communications such as Ethernet communications, other communication standards, hardware, or software can be utilized to provide communications of sufficient bandwidth to perform the operations, teachings, and methods as disclosed herein.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An authentication engine for an information handling system, the authentication engine comprising:
   a hardware memory; and
   a hardware processor configure to instantiate:
   an event engine that receives authentication information from a plurality of input devices of the information handling system and classifies the authentication information from each input device into a plurality of events, and provides confidence score metadata based upon the authentication information;
   a confidence module that generates a confidence score based upon the events; and
   a threshold table that receives the confidence score and determines an authentication state of the information handling system based upon the confidence score, wherein when the confidence score rises above a first threshold level the authentication state is at a first state, when the confidence score rises above a second threshold higher than the first threshold the authentication state is at a second state, and when the confidence score falls below the second threshold the authentication state returns to the first state;
   wherein the events include a risk event that decreases the confidence score, an assurance event that increases the confidence score, a context event that indicates that an operating state of the information handling system has changed, and a time-based event; and
   wherein in generating the confidence score the confidence module further permits a dwell time during which the confidence score remains constant without additional inputs from the input devices, linearly decreases the confidence score after the dwell time without the additional inputs from the input devices, graphs a region of passive authentication that increases the confidence score, detects a reverse authentication event indicating a loss of a network connection, retrieves a logical rule that reduces the confidence score in response to the detecting of the reverse authentication event indicating the loss of the network connection, and provides the confidence score to the threshold table.

2. The authentication engine of claim 1, wherein the authentication engine receives an authentication request, and generating the confidence score is in response to receiving the authentication request.

3. The authentication engine of claim 2, wherein providing the confidence score metadata is in further response to receiving the authentication request.

4. The authentication engine of claim 2, wherein determining the authentication state is in further response to receiving the authentication request.

5. The authentication engine of claim 1, the processor further to instantiate:
   a time base, wherein the confidence score metadata is further based upon the time base.

6. The authentication engine of claim 1, wherein the plurality of events comprises risk events, assurance events, context events, and recognition events.

7. The authentication engine of claim 1, wherein the threshold table comprises a plurality of thresholds.

8. The authentication engine of claim 7, wherein in determining the authentication state, the threshold table compares the confidence score to the plurality of thresholds.

9. The authentication engine of claim 7, wherein the plurality of thresholds are selectable via a basic input output system (BIOS) of the information handling system.

10. A method, comprising:
    receiving, at an event engine instantiated on a hardware processor of an authentication engine of an information handling system, authentication information from a plurality of input devices of the information handling system;

classifying the authentication information from each input device into a plurality of events;

providing confidence score metadata based upon the authentication information;

generating a confidence score based upon the events, wherein in generating the confidence score, the method further comprises:

permitting a dwell time during which the confidence score remains constant without additional inputs from the input devices;

linearly decreasing the confidence score after the dwell time without additional inputs from the input devices;

graphing a region of passive authentication that increases the confidence score;

detecting a reverse authentication event indicating a loss of a network connection; and retrieving a logical rule that reduces the confidence score in response to the detecting of the reverse authentication event indicating the loss of the network connection;

receiving, at a threshold table instantiated on the hardware processor, the confidence score, wherein the events include a risk event that decreases the confidence score, an assurance event that increases the confidence score, a context event that indicates that an operating state of the information handling system has changed, and a time-based event; and determining an authentication state of the information handling system based upon the confidence score, wherein when the confidence score rises above a first threshold level the authentication state is at a first state, when the confidence score rises above a second threshold higher than the first threshold the authentication state is at a second state, and when the confidence score falls below the second threshold the authentication state returns to the first state.

11. The method of claim 10, further comprising:
receiving an authentication request, wherein generating the confidence score is in response to receiving the authentication request.

12. The method of claim 11, wherein providing the confidence score metadata is in further response to receiving the authentication request.

13. The method of claim 11, wherein determining the authentication state is in further response to receiving the authentication request.

14. The method of claim 10, wherein the confidence score metadata is further based upon a time base.

15. The method of claim 10, wherein the plurality of events comprises risk events, assurance events, context events, and recognition events.

16. The method of claim 10, wherein the threshold table comprises a plurality of thresholds.

17. The method of claim 16, wherein in determining the authentication state, the method further comprises:

comparing, by the threshold table, the confidence score to the plurality of thresholds.

18. The method of claim 16, further comprising:
selecting the plurality of thresholds via a basic input output system (BIOS) of the information handling system.

19. A non-transitory computer-readable medium including code for performing a method, the method comprising:
receiving, at an event engine of an authentication engine of an information handling system, authentication information from a plurality of input devices of the information handling system;

classifying the authentication information from each input device into a plurality of events;

providing confidence score metadata based upon the authentication information;

generating a confidence score based upon the events, wherein in generating the confidence score, the method further comprises:

permitting a dwell time during which the confidence score remains constant without additional inputs from the input devices;

linearly decreasing the confidence score after the dwell time without the additional inputs from the input devices;

graphing a region of passive authentication that increases the confidence score;

detecting a reverse authentication event indicating a loss of a network connection: and retrieving a logical rule that reduces the confidence score in response to the detecting of the reverse authentication event indicating the loss of the network connection;

receiving, at a threshold table of an authentication engine, the confidence score, wherein the events include a risk event that decreases the confidence score, an assurance event that increases the confidence score, a context event that indicates that an operating state of the information handling system has changed, and a time-based event; and determining an authentication state of the information handling system based upon the confidence score, wherein when the confidence score rises above a first threshold level the authentication state is at a first state, when the confidence score rises above a second threshold higher than the first threshold the authentication state is at a second state, and when the confidence score falls below the second threshold the authentication state returns to the first state.

20. The computer-readable medium of claim 19, wherein:
the threshold table comprises a plurality of thresholds; and in determining the authentication state, the method further comprises comparing, by the threshold table, the confidence score to the plurality of thresholds.

* * * * *